United States Patent [19]

Efron et al.

[11] Patent Number: 4,913,531
[45] Date of Patent: Apr. 3, 1990

[54] LIQUID CRYSTAL LIGHT VALVE WITH GROOVED MICROGRID AND METHOD OF FORMING THE SAME

[75] Inventors: Uzi Efron, Los Angeles; Murray S. Welkowsky, Chatsworth; Norman W. Goodwin, Encino, all of Calif.

[73] Assignee: Hughes Aircraft Company, Los Angeles, Calif.

[21] Appl. No.: 241,680

[22] Filed: Sep. 7, 1988

[51] Int. Cl.[4] .............................................. G02F 1/13
[52] U.S. Cl. ................................ 350/342; 350/347 V; 350/348; 350/338; 437/2; 437/225; 437/227; 437/228
[58] Field of Search ............... 350/336, 342, 348, 338, 350/347 V; 437/2, 5, 225, 227, 228

[56] References Cited

U.S. PATENT DOCUMENTS

| | | | |
|---|---|---|---|
| 3,745,044 | 7/1973 | Letter | 437/5 |
| 3,811,180 | 5/1974 | Braunstein et al. | 437/5 |
| 4,069,095 | 1/1978 | Lorenze, Jr. et al. | 437/5 X |
| 4,239,348 | 12/1980 | Grinberg et al. | 350/342 |
| 4,251,137 | 2/1981 | Knop et al. | 350/348 X |
| 4,619,501 | 10/1986 | Armitage | 350/386 |
| 4,638,552 | 1/1987 | Shimbo et al. | 437/225 X |
| 4,690,729 | 9/1987 | Douglas | 437/225 X |
| 4,729,641 | 3/1988 | Matsuoka et al. | 350/348 |
| 4,826,300 | 5/1989 | Efron et al. | 350/342 |
| 4,829,013 | 5/1989 | Yamazaki | 437/2 |
| 4,838,952 | 6/1989 | Dill et al. | 437/2 X |

OTHER PUBLICATIONS

Efron et al., "The Silicon Liquid-Crystal Light Valve", Journal of Applied Physics 57(4), Feb. 15, 1985, pp. 1356-1358.

Grinberg et al., "A New Real-Time Non-Coherent to Coherent Light Image Invertor-The Hybrid Field Effect Liquid Crystal Light Valve", Optical Engineering 14, 217 (1975).

*Primary Examiner*—Stanley D. Miller
*Assistant Examiner*—Richard Gallivan
*Attorney, Agent, or Firm*—V. D. Duraiswamy; P. M. Coble; W. K. Denson-Low

[57] ABSTRACT

A liquid crystal light valve is provided with a microgrid of grooves in the photoconductor surface to divide the photoconductor into high resolution pixels. The liquid crystals fill the grooves to seal them and contribute to a potential barrier at the grooves that prevents lateral charge migration between pixels. In a metal oxide semiconductor (MOS) embodiment an oxide layer extends over the pixels and partially overhangs the grooves. A metal matrix mirror is formed over the insulative layer, and extends into a portion of the grooves to shield the underlying silicon from photoactivation while maintaining an electrical isolation between pixels.

24 Claims, 6 Drawing Sheets

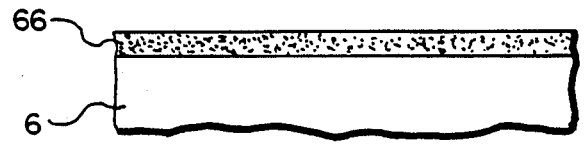
FIG.10.A.
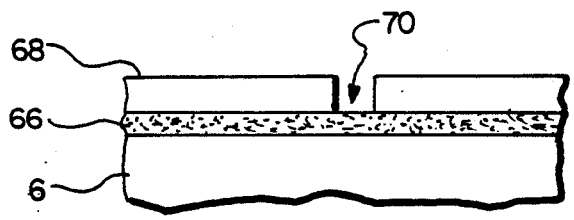
FIG.10.B.
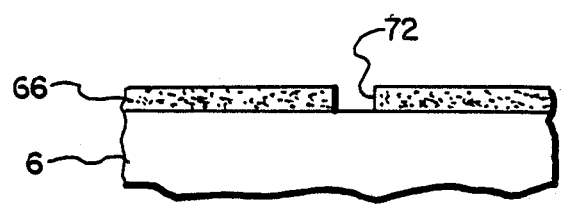
FIG.10.C.
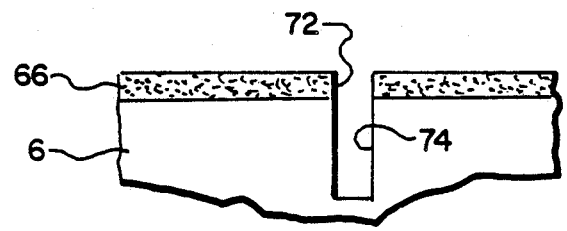
FIG.10.D.
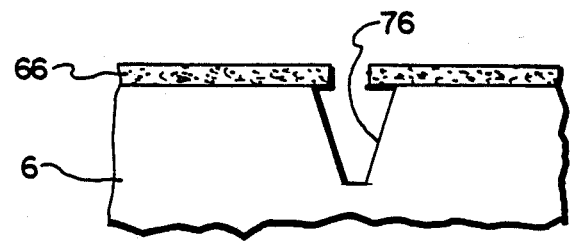
FIG.10.E.
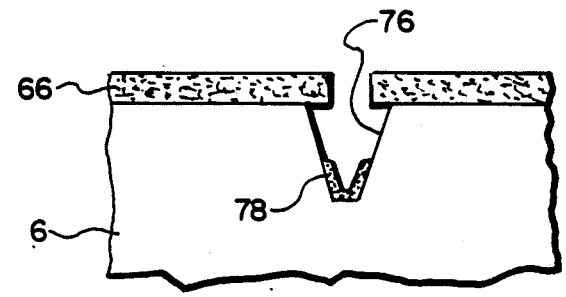
FIG.10.F.

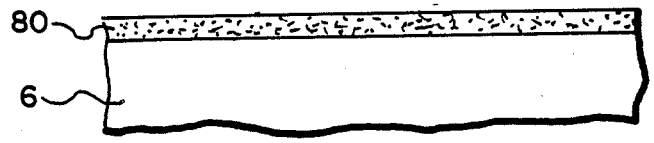
FIG.II.A.
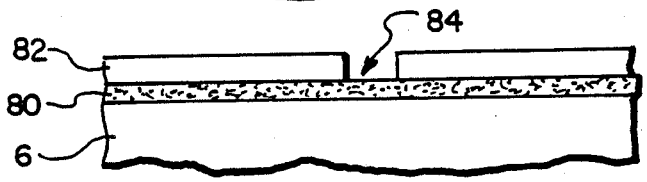
FIG.II.B.
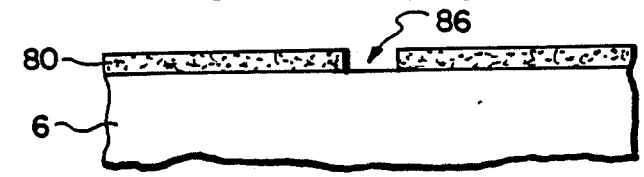
FIG.II.C.
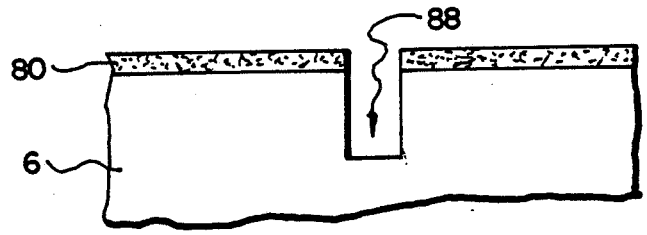
FIG.II.D.
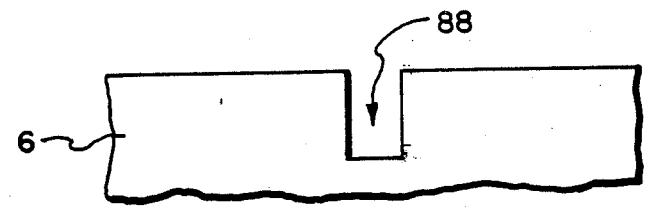
FIG.II.E.
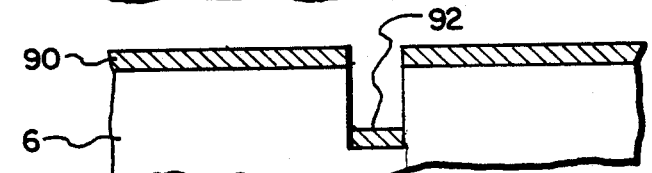
FIG.II.F.
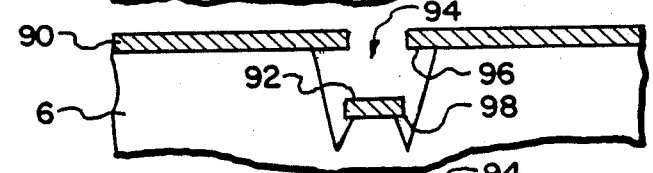
FIG.II.G.
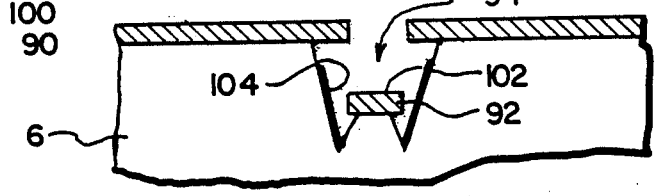
FIG.II.H.

LIQUID CRYSTAL LIGHT VALVE WITH GROOVED MICROGRID AND METHOD OF FORMING THE SAME

GOVERNMENT RIGHTS IN INVENTION

This invention was made with U.S. government support under Contract No. F 30602-85-C-0234 awarded by the Department of the Air Force. The U.S. government has certain rights in this invention.

BACKGROUND OF THE INVENTION

1. Field of the Invention

This invention relates to liquid crystal light valves (LCLVs), and more particularly to light valves designed to have a high resolution and dynamic range.

2. Description of the Related Art

Light valves, generally employing liquid crystals as an electro-optic medium, are used to spatially modulate a readout beam in accordance with an applied input signal pattern. They can be used to greatly amplify the input pattern by controlling a readout beam of much greater intensity, to convert spatially modulated incoherent radiation to a coherent readout laser beam with a similar spatial modulation, for optical data processing, wave-length conversion, or for other purposes that involve the conversion of an input signal pattern to a corresponding spatial modulation on a separate readout beam.

An earlier type of LCLV used a cadmium sulfide (CdS) photoconductor medium. This type of device is described, for example, in Grinberg et al., "A New Real-Time Non-Coherent to Coherent Light Image Invertor—The Hybrid Field Effect Light Crystal Light Valve", Optical Engineering 14, 217 (1975).

The main drawback of the CdS-based light valve has been its slow response time. A second generation silicon-based LCLV has been developed which retains the advantages of the CdS-based light valve and has a considerably faster response time. The silicon-based device is described in an article by Efron et al., "The Silicon-Liquid Crystal Light Valve", Journal of Applied Physics 57(4), pages 1356-68 (1985). This article also summarizes some of the prior light valve efforts.

The internal construction of a silicon-based LCLV is shown in FIG. 1. An input image beam on the input side of the device is identified by reference numeral 2, while a readout beam 4 is directed onto, and reflected from, the opposite side of the device. A layer of high resistivity silicon photoconductor 6 has a thin P++ back contact layer 8 formed on its input side. This back contact provides a high sheet conductivity to present a very small load at any point in the device's cross-section where carriers are generated. It also gives the device a linear operation, avoiding a situation in which the sensitivity and resolution are dependent upon the input light level, and provides higher output uniformity under dark conditions. An $SiO_2$ oxide layer 10 is provided on the input side of back contact 8, with a fiber optic plate 12 adhered to the oxide layer by means of an optical cement 14. A DC-biased n-type diode guard ring 16 is implanted at the opposite edge of the silicon photoconductor wafer 6 from back contact 8 to prevent peripheral minority carrier injection into the active region of the device. An $SiO_2$ gate insulator layer 18 is formed on the readout side of the silicon photoconductor 6. Isolated potential wells are created at the $Si/SiO_2$ interface by means of an n-type microdiode array 20. This prevents the lateral spread of signal electrons residing at the interface, and thereby enhances the device's resolution.

A unified thin film dielectric mirror 22 is located on the readout side of the gate oxide layer 18 to provide broad-band reflectivity, as well as optical isolation to block the high intensity readout beam from activating the silicon photoconductor layer 6. A thin film of fast response liquid crystal 24 is employed as a light modulating medium on the readout side of mirror 22. A front glass plate 26 is coated with an indium tin oxide (ITO) counter electrode 28 adjacent the liquid crystal. The front of glass plate 26 is coated with an anti-reflection coating 30, and the whole structure is assembled within an airtight anodized aluminum holder. Silicon photoconductor 6 is shown coupled with oxide layer 18 and transparent metallic electrode coating 28 to form an MOS structure. The combination of the insulating liquid crystal, oxide and mirror act as the insulating gate of the MOS structure.

In operation, an alternating voltage source 32 is connected to one side of back contact 8 by means of an aluminum back contact pad 34, and on its opposite side to counter electrode 28. The voltage across the two electrodes causes the MOS structure to operate in alternate depletion (active) and accumulation (inactive) phases. In the depletion phase, the high resistivity silicon photoconductor layer 6 is depleted and electron-hole pairs generated by input light beam 2 are swept by the electric field in the photoconductor, thereby producing a signal current that activates the liquid crystal. The electric field existing in the depletion region acts to sweep the signal charges from the input side to the readout side, and thus preserves the spatial resolution of the input image. The polarized readout beam 4 enters the readout side of the light valve through glass layer 26, passes through the liquid crystal layer 24, and is reflected by dielectric mirror 22 back through the liquid crystal.

Since the conductivity of each pixel in photoconductor layer 6 varies with the intensity of input beam 2 at that pixel, a voltage divider effect results which varies the voltage across the corresponding pixel of the liquid crystal in accordance with the spatial intensity of the input light. As is well known, the liquid crystals at any location will orient themselves in accordance with the impressed voltage, and the liquid crystal orientation relative to the readout light polarization at any particular location will determine the amount of readout light that will be reflected back off the light valve at that location. Thus, the spatial intensity pattern of the input light is transferred to a spatial liquid crystal orientation pattern in the liquid crystal layer 24, which in turn controls the spatial reflectivity of the light valve to the readout beam.

An important function of the dielectric mirror 22 is to block readout light and prevent it from activating the photoconductor substrate 6. The intensity of the readout beam may be on the order of $10^6-10^8$ times the input beam intensity. During the active (depletion) phase of light valve operation, minority carriers are transported from the back face of the photoconductor layer to the readout face adjacent the dielectric mirror. It is this accumulation of a small quantity of spatially resolved carriers at the readout face that produces a voltage pattern for activating the liquid crystal layer. Since the photoconductor layer 6 is photosensitive, a dielectric mirror/light blocking layer 22 is required to prevent the high intensity readout light from generating spatially unresolved carriers in the photoconductor that would otherwise swamp the signal charge. Typically, the dielectric mirror/light blocking layer 22 must attenuate the readout beam by a factor of about $10^6$ or more, so that the number of carriers accumulated during the active phase due to light leakage through the dielectric mirror/light blocking layer does not approach or exceed the signal charge. It is quite difficult to fabricate a dielectric mirror with this capability. Although an attenuation of $10^7$ has been achieved, some applications require greater attenuations, for which adequate dielectric mirrors are not presently available.

As a possible substitute for a dielectric mirror, a recently developed metal matrix mirror has been demonstrated to provide good electrical and optical properties for LCLVs operating in the infrared region. This type of mirror is described in co-pending U.S. patent application Ser. No. 759,004, "Reflective Matrix Mirror Visible to Infrared Converter Light Valve", by P. O. Braatz, and assigned to Hughes Aircraft Company, the assignee of the present invention.

A metal matrix mirror is illustrated in FIG. 2. A matrix of reflected islands 36 is formed on an insulative layer 38, such as $SiO_2$, on the silicon photoconductor substrate 40. The islands 36 are separated from each other so as to avoid short-circuits across the face of the mirror. The dimensions of the individual islands 36 are determined from a minimum size for adequate reflection, on the order of 5-20 microns, and the resolution or pixel element size for which the light valve is designed. The thickness of the islands depends upon the specific reflective material employed. There is a basic requirement that the free electron density of the reflective material be sufficient to interact with the readout radiation and scatter it back out of the material. Metals such as aluminum or silver or metal/semiconductor compounds such as platinum-silicide may be used.

Although the dielectric mirror version of the LCLV described above can be used over a fairly wide range of wavelengths, it suffers from a charge spillover phenomenon that exists in the microdiodes as a result of a lateral punch-through mechanism under higher illumination levels. This spillover, from an activated pixel to an adjacent non-activated pixel, reduces the dynamic range of the device and can degrade its resolution.

The metal matrix mirror version, on the other hand, has been limited principally to infrared radiation because of the bandgap of the silicon substrate. In the visible region, readout light leaks through the vacant channels separating the metal islands, causing activation of the underlying photoconductor. Since only about 70% of the readout surface is occupied by the reflective islands, enough light leaks through between the islands to effectively prevent operation in the visible region.

Another type of light modulator is disclosed in U.S. Pat. No. 4,619,501 to Armitage. In this device a solid electro-optic crystal is used instead of liquid crystals. Lithium niobate, lithium tantalate and potassium dideuterium phosphate are suggested for the solid crystal materials. A lattice of microgrooves is formed on the surface of the silicon wafer to prevent lateral charge movement. A light blocking layer is provided on top of the silicon wafer, followed by a dielectric mirror, and then the electro-optic crystal. Although seeking to prevent lateral charge movement between pixels, the open microgrooves can potentially become contaminated with moisture. This is turn can cause short circuits between adjacent pixels, a variable dielectric constant as the moisture content varies over time, and unstable light valve operation.

SUMMARY OF THE INVENTION

In view of the above problems, the present invention seeks to provide a LCLV with high levels of resolution and dynamic range, which effectively eliminates charge spill-over between adjacent pixels, which avoids the limitations of a dielectric mirror, which is not restricted to a narrow waveband as are metal matrix mirrors, and which is stable and not readily subject to contamination.

The above goals are achieved with a new LCLV in which a grid of grooves extend into the readout side of the photoconductor material and divide it into a matrix of pixels. The grooves are formed immediately adjacent to the liquid crystal, which can flow into and fill open spaces in the grooves. Charge spillover between the pixels is prevented because of an effective potential barrier at the grooves.

In preferred embodiments, an optical filter is provided on the readout side of the device with light blocking elements positioned at locations corresponding to diffraction gratings formed by the grooves. The device is preferably formed so that islands of insulative material extend over the pixels between the silicon wafer and the liquid crystal, with the insulative material overhanging and partially closing the grooves between pixels. Layers of reflective material, comprising a metal matrix mirror, are formed on the insulative islands to reflect a readout beam from the underlying photoconductor material. The insulative and reflective materials extend partially across the grooves to shield the underlying photoconductor material from the readout beam. The grooves are formed so that they are wider at their upper than at their lower ends, thereby enabling the formation of the insulative overhangs.

A related method for pixelizing the photoconductor wafer to form the microgrooves involves the provision of a layer of insulative material on the surface of the wafer, forming a grid of openings in the insulative layer corresponding to the desired microgrid, and etching the wafer through said openings to form the pixel-defining grooves in the wafer. The etching is controlled so that the insulative material overhangs and partially closes the grooves. This can be accomplished either by a wet etch, or by a dry etch followed by a wet etch. A passivating insulative material such as $SiO_2$ may then be deposited into the grooves, followed by the deposition of a reflective conductive material both onto the pixels to act as a metal matrix mirror, and into the grooves to shield the underlying photoconductor material from a readout beam. The groove overhangs create electrical discontinuities in the reflective conductive material within the grooves, thereby preventing short circuits between adjacent pixels. The reflective conductive material is preferably deposited in the grooves at substantially the same angle as the intended readout beam angle, thereby providing further assurance against photoactivation of the underlying photoconductor material.

These and other features and advantages of the invention will be apparent to those skilled in the art from the following detailed description of preferred embodiments, taken together with the accompanying drawings, in which:

DESCRIPTION OF THE DRAWINGS

FIGS. 10a–10f are cross-sectional views illustrating successive steps in the formation of the grooves for a MOS LCLV structure; and FIGS. 11a–11h are cross-sectional views illustrating successive steps in the formation of the grooves for a Schottky LCLV structure.

DETAILED DESCRIPTION OF THE INVENTION

The present invention solves the problems outlined above by providing a LCLV with a grooved microgrid in the photoconductor and overlying insulative oxide layer immediately adjacent a reservoir of liquid crystals. The reduction in the thickness of the photoconductor immediately below each groove contributes to a relative reduction in the electrical potential at the grooves as compared to the potential at the pixel areas between grooves. This potential difference is enhanced by the increase in the thickness of the liquid crystal layer at the grooves which results from the liquid crystals flooding the grooves. The result is an effective barrier to the migration of charge between adjacent pixels, and a corresponding enhancement of resolution. Furthermore, the device has a wide dynamic range and is operable in both the IR and visible regions.

Figure 1:
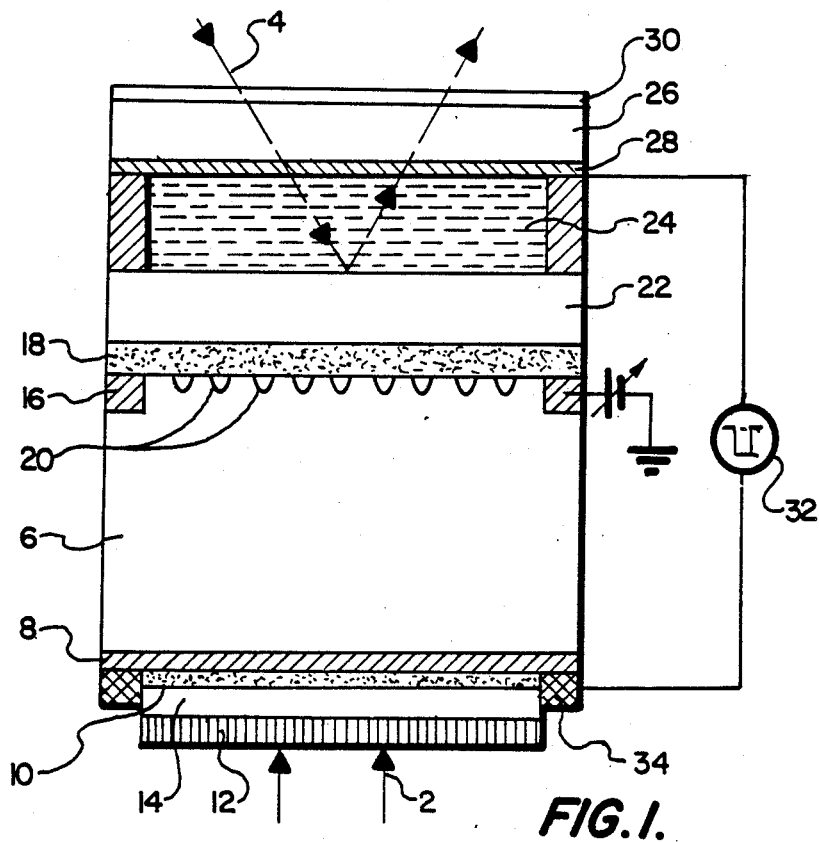
FIG. 1, described above, is a sectional view of a prior art LCLV utilizing a dielectric mirror.
Figure 2:
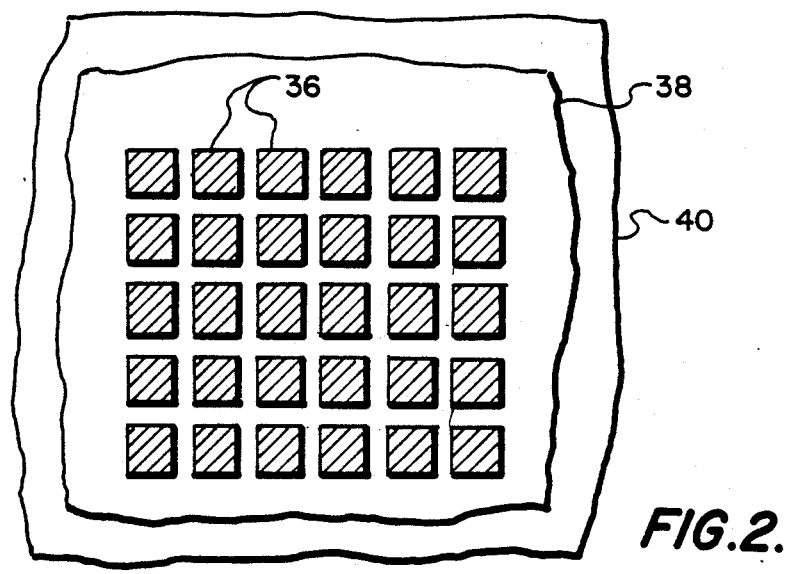
FIG. 2, described above, is a plan view of a metal matrix mirror structure.
Figure 3:
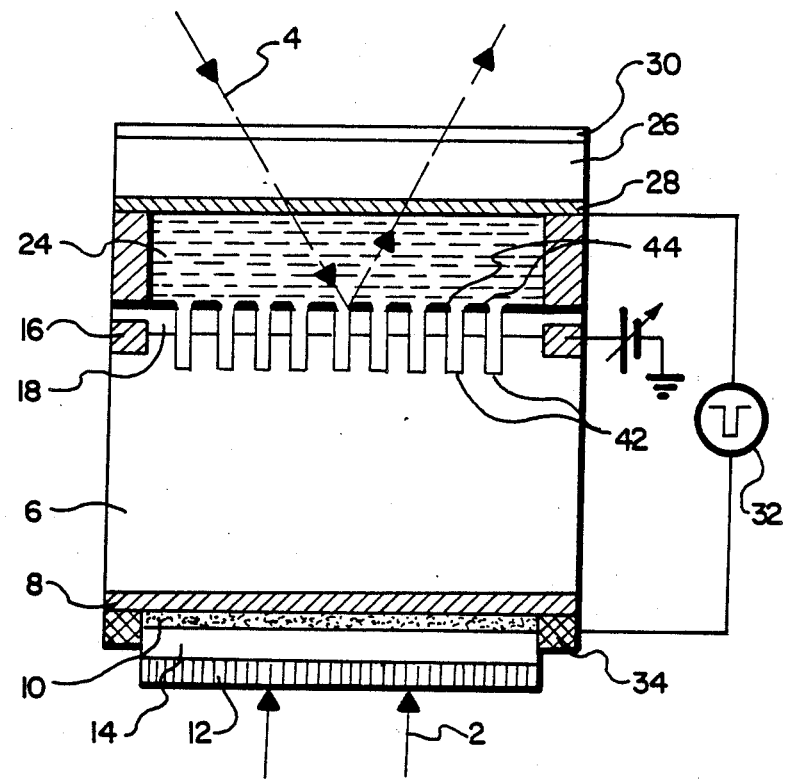
FIG. 3 is a sectional view of a LCLV constructed in accordance with the invention.

One embodiment of the invention is shown in FIG. 3. This embodiment is generally similar to the prior MOS LCLV shown in FIG. 1, and common elements are identified by the same reference numerals. However, no dielectric mirror is used. Rather, a grid of microgrooves 42 extend down through the oxide layer 18 and into the silicon photoconductor wafer 6 to divide the wafer into an array of pixels between grooves. The oxide layer is covered by a metal matrix mirror in the form of a conductive reflective layer 44 which is also divided into pixel elements by the grooves. The metal matrix mirror is preferably formed from aluminum, which is easy to deposit and etch, but may also be implemented with other metals such as chrome or gold, which have good adhesion characteristics and are more inert than aluminum.

Figure 4:
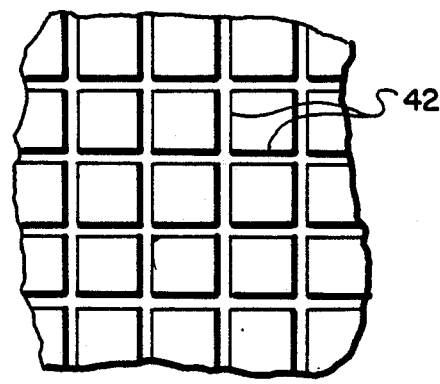
FIG. 4 is a fragmentary plan view showing a portion of the grooved grid pattern formed in the photoconductor and overlying insulative layer.

FIG. 4, which is not drawn to scale, gives a plan view of the groove pattern. The depths of the grooves will generally depend upon the desired level of isolation between pixels, while the widths of the grooves can vary with the desired resolution. In general, the size of the pixels will decrease as the resolution increases, and the width of the grooves will normally correspondingly decrease. Typical thicknesses for the various layers are 4 and 120 microns for the silicon wafer. The grooves are generally about 5–20 microns deep and 2–5 microns wide, although dimensions outside of this range are possible.

Figure 5:
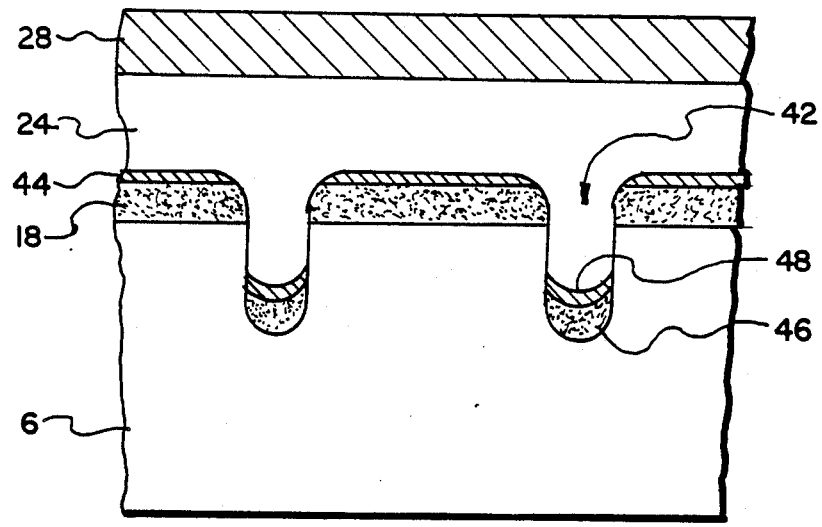
FIG. 5 is an enlarged sectional view showing a basic form of the photoconductor grooves.

FIG. 5 shows a simplified form of the grooves 42. In this embodiment the groove walls are generally vertical. Layers of oxide 46 and reflective metal 48 are also provided at the bottom of each groove to shield the underlying silicon photoconductor from the readout light beam. This makes it possible to use a metal matrix mirror in the visible region without activating the photoconductor, at least for a vertical readout beam. The metal 48 within the grooves is electrically isolated from the metal matrix mirror pads 44 by the vertical groove walls, thereby inhibiting shorting between pixels.

To inhibit photoactivation of the silicon when the readout beam is not vertical, the oxide 46 could be extended up the vertical walls of the grooves 42, and the metal 48 also extended upward along the surface of the oxide. The metal layer would block light from reaching the silicon, while the oxide provides electrical insulation. Should photoactivation still be a problem, operation in the visible range of the electromagnetic spectrum might be limited to relatively low intensities suitable for applications such as optical data processing (output: input intensity ratio on the order of 10–100).

Figure 6:
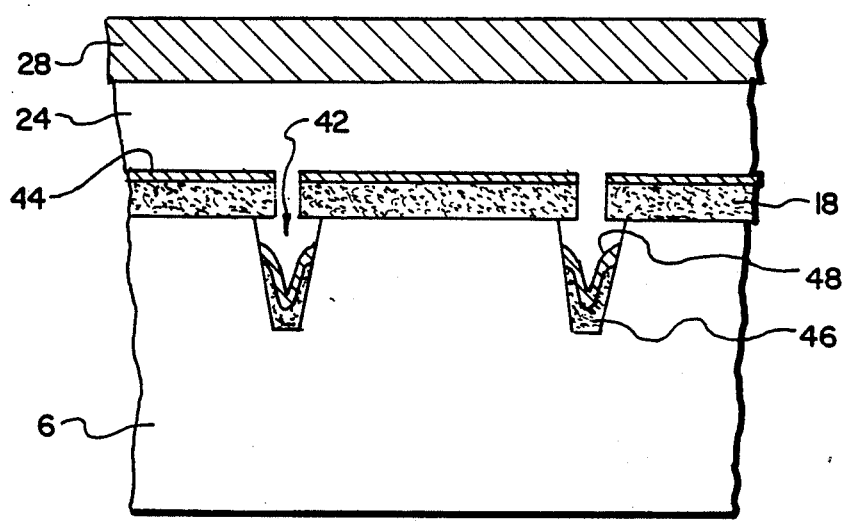
FIG. 6 is an enlarged sectional view showing a preferred form of the grooves partially shielded by an overhanging semiconductive layer.

FIG. 6 shows an alternate and more preferred embodiment in which the grooves 42 are generally V-shaped, and the oxide layer 18 and overlying metal matrix mirror pads 44 overhang and partially close the grooves. With this embodiment the spacing between adjacent metal matrix mirror pads 44 is less, thereby permitting the pads themselves to be made smaller in area with a corresponding increase in resolution. The overhang also helps to strengthen the electrical discontinuity within the grooves that electrically isolates each pixel from its neighbors. Again, oxide and reflective layers 46 and 48 are provided within each groove to reflect any readout light that enters through the openings between adjacent pixels. Although the walls of the grooves are shown as straight lines, in actual practice they will generally not have a uniform taper, but rather will be more flared at their upper ends.

Figure 7:
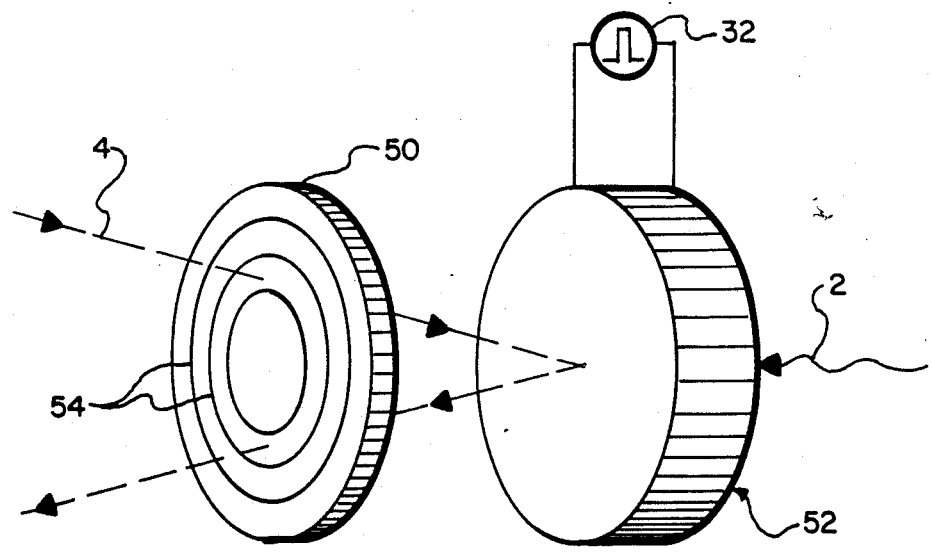
FIG. 7 is a simplified perspective view of a LCLV in accordance with the invention together with a filter for eliminating the effects of accompanying diffraction gratings in the valve.

In each of the above embodiments, the liquid crystal enters the grooves between pixels. This increases the potential difference that prevents charge spreading and enhances resolution, and also eliminates air gaps within the grooves that can be contaminated with undesirable accumulations of water over time. However, the alternating depth of the liquid crystal layer can produce diffraction gratings in the readout beam. The effect of such gratings can be mitigated as illustrated in FIG. 7 by positioning an optical filter 50 on the readout side of the LCLV 52. The filter 50 has light blocking elements 54 at locations corresponding to the fixed locations of the diffraction gratings, and thereby eliminates the diffraction peaks from the readout beam.

Figure 8:
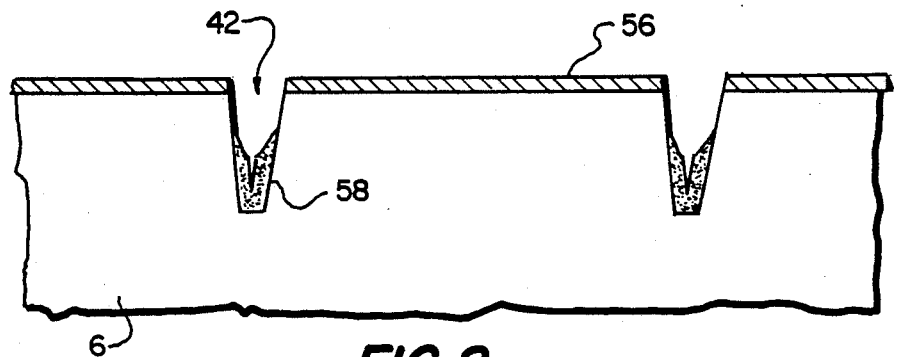
FIG. 8 is an enlarged sectional view showing the grooves for an alternate embodiment of the invention involving a Schottky LCLV structure.

The invention is also applicable to a Schottky LCLV, in which a metal matrix mirror is applied directly onto the silicon photoconductor, as well as to the MOS device described above. A Schottky version is illustrated in FIG. 8. Grooves 42 are formed in the silicon wafer 6 as before. However, in this case there is no insulative oxide layer. Rather, a metal layer 56 is deposited directly onto the pixel mesas, and also into the interior of the channels 42 to form shield layers 58 within the channels. With conventional metal evaporation techniques, complete metal coverage is normally unobtainable around any step in the surface being coated. Thus, the normal metal evaporation process will leave a gap between the elements of metal matrix mirror 56 and the metal 58 within the grooves, thereby preventing shorting between pixels. Greater protection against photoactivation of the silicon may be provided by extending metal 58 further up the sides of the groove, but again operation in the visible range may be restricted to relatively low intensities if photoactivation is a problem.

Figure 9:
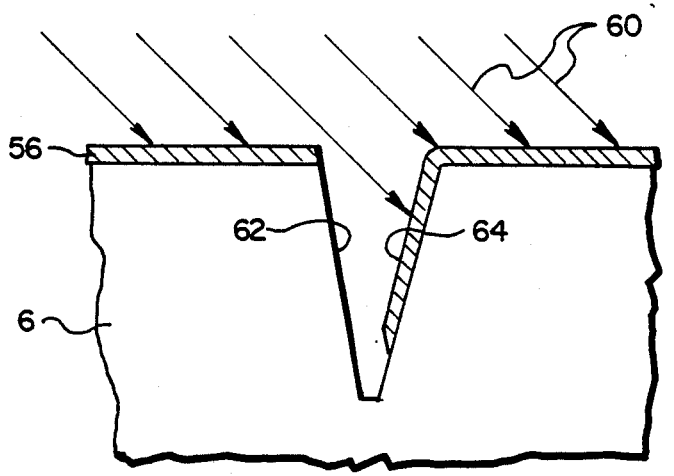
FIG. 9 is an enlarged elevation view illustrating the manner of metal deposition for the embodiment of FIG. 8.

Even greater isolation between pixels and protection of the underlying silicon photoconductor is obtained if the metal is evaporated onto the silicon wafer at an angle corresponding to the expected angle of the readout beam. This technique is illustrated in FIG. 9. The metal is evaporated onto the surface of the silicon wafer at an angle, illustrated by arrows 60, which is similar to the expected angle of a readout beam. In this way one side 62 of the groove is in shadow and does not receive a metal deposit. At the same time, the opposite side 64 of the channel does receive a metal coating that extends all the way up to the top of the groove. Since this is the side which will also be illuminated by a readout beam, while the first side 62 remains in shadow for a readout beam, a substantially complete optical shield is provided for the underlying silicon wafer.

The preferred fabrication technique for the grooves is illustrated in FIGS. 10a-10f. Initially, as shown in FIG. 10a, an insulative layer 66 is formed over silicon wafer 6. SiO$_2$ is preferred for the insulative material because it is easy to form, being a natural result of placing the silicon wafer in a furnace and oxidizing it. Alternate insulative materials include silicon nitride (Si$_3$N$_4$) and tantalum pentoxide (Ta$_2$O$_5$). The SiO$_2$ layer is grown using either an anodic, plasma enhanced chemical vapor deposition, or thermal oxide process.

In the next step (FIG. 10b), a layer of photoresist 68 is laid down over the oxide, exposed by standard photolithographic techniques, and washed away to leave a groove 70 in the photoresist. For a positive photoresist the area corresponding to groove 70 would be exposed and washed away, while for a negative photoresist the other areas would be exposed so that groove 70 can be washed away.

An etchant, preferably a buffered oxide etch, is then applied through the photoresist groove 70 to form a similar groove 72 in the oxide layer, thereby exposing the underlying silicon wafer surface. The remainder of the oxide layer is protected from the etchant by photoresist 68, which is removed after the formation of groove 72 in the oxide layer. The resulting structure is illustrated in FIG. 10c.

If a particularly narrow groove is desired, a dry etchant is next applied to the silicon groove 72 in the oxide. Dry etching will form a narrow, generally vertical groove 74, as shown in FIG. 10d. With a dry etch, however, the grooves may be so narrow that it is not practical to evaporate metal into them to prevent photoactivation of the silicon. Accordingly, the dry etch may be followed by a wet etch, in which the etching action occurs in a lateral direction as well as downward (downward etching is generally about 3-10 times faster than lateral etching). This will result in the tapered groove 76 illustrated in FIG. 10e. It should be noted that the lateral etching which has taken place at the upper portion of the groove produces the desired overhang of oxide layer 66 over the top of the groove.

A dry etch will generally produce a groove approximately 2 microns wide, depending upon the particular mask which is used. If a wider groove is desired, the dry etch step can be bypassed, and a single wet ethylenediamine pyrocatechol water etch use for the silicon. This will produce a more pronounced taper for the groove 76, with the overhang of oxide layer 66 covering a greater portion of the groove. It should be noted that, although a continuous taper is shown in the illustration of FIG. 10e, in actual practice a wet etch will tend to produce a greater taper towards the top of the grooves. This is because the etchant further down in the grooves tends to become diluted from the narrowness of the groove and from silicon which has been etched off of the wafer, whereas the top of the groove is continuously supplied with fresh wet etchant.

Another oxide layer is next deposited to lay down a layer 78 which passivates the exposed silicon in the groove. Unless it is masked, this deposition step also adds to the thickness of the oxide layer 66 in the pixel areas between grooves. In this step either anodic or thermal oxide must be used, since deposited plasma enhanced chemical vapor deposition would be masked by the oxide overhangs.

Finally, a metal mirror is deposited to produce a structure as shown in FIG. 6. If a Schottky structure is desired instead of MOS, the same fabrication steps 10a-10e would be followed as for the MOS device. However, after the desired grooves in the silicon are formed, the oxide layer would be removed from the silicon wafer by standard techniques. A metal matrix mirror such as that illustrated in either FIG. 8 or 9 would then be evaporated directly onto the silicon.

The action of the grooves in preventing lateral charge flow between adjacent pixels may be understood by referring back to FIG. 5. The silicon and liquid crystal layers essentially form a voltage divider. If the thickness of one layer is increased or reduced, there will be a corresponding change in the proportion of the total voltage which is carried by that layer. In the area of grooves 42 in FIG. 5, the thickness of the silicon layer is reduced while the thickness of the liquid crystal layer is increased, as compared with the situation in the pixel areas between grooves. Thus, the electric potential at the surface of the silicon at the bottom of a groove will be less than that of the silicon at the surface of the pixels (the voltage drop across the oxide layer can essentially be ignored because the oxide layer is so thin compared to the silicon and liquid crystal layers). The higher surface potential at the pixel compared to that at the groove creates an effective potential barrier to lateral charge migration at the grooves. The potential difference for a typical LCLV is calculated to be about 3-4 volts, which is comparable to that for the prior microdiode LCLV.

FIGS. 11(a)-(h) illustrate the fabrication steps for an improved Schottky structure in which photoactivation of the silcon substrate is minimized. An SiO$_2$ layer 80 is first laid down over the substrate 6, as shown in FIG. 11(a). A layer of photoresist 82 is next formed over the oxide layer 80, with grooves 84 patterned by photolithography in the photoresist—FIG. 11(b). The grooves 86 are then formed in the oxide, after which the photoresist is removed—FIG. 11(c).

The silicon substrate is then etched with a dry etchant through groove 86, with the oxide layer 80 acting as a mask for the remainder of the substrate. A corresponding groove 88 is formed in the substrate, as shown in FIG. 11(d). Since a dry etchant is used, the walls of groove 88 are substantially vertical. The oxide layer is then stripped by another buffered oxide etch, leaving the substrate 6 with the groove pattern 88 as shown in FIG. 11(e).

In the next step a metal layer 90 is evaporated onto the surface of the substrate, with a similar layer 92 evaporated onto the bottom of channel 88—see FIG. 11(f). The metal layer 90 preferably consists of a few hundred Angstroms of platinum, which forms a good Schottky contact with the underlying silicon substrate, topped by an aluminum layer, a few thousand Angstroms thick, which serves as a mask for a subsequent etch step. The metal is evaporated vertically so that the side walls of groove 88 are substantially free of metal coating.

A wet etch is next applied which etches the silicon adjacent to groove 88 both outward and downward, forming an enlarged groove 94 as illustrated in FIG. 11(g). The metal is not etched away, resulting in metallic overhangs 96 above the overall groove, and additional metallic overhangs 98 over the lower portion of the groove below metal floor 92. Finally, another aluminum evaporation is performed, establishing additional aluminum layers 100 and 102 over the metal layers 90 and 92, respectively. This evaporation is performed in a planetary method in which the substrate is rotated during evaporation, resulting in aluminum layers 104 also being evaporated over most of the side walls of groove 94. The overhangs 96 and 98 together with the aluminum side wall layers 104 effectively prevent photoactivation of the silicon substrate for all but extreme readout angles.

A novel LCLV with improved resolution and dynamic range has thus been shown and described. It should be understood, however, that numerous variations and alternate embodiments will occur to those skilled in the art. For example, the invention could be implemented with a transmissive LCLV rather than the reflective device illustrated. Accordingly, it is intended that the invention be limited only in terms of the appended claims.

We claim:

1. A liquid crystal light valve (LCLV) having an input side and a readout side, comprising:
    a layer of photoconductor material,
    an electrode on the input side of the photoconductor material,
    a grid of grooves extending into the readout side of the photoconductor material and dividing said material into a matrix of pixels,
    a liquid crystal (LC) layer on the readout side of said photoconductor material and extending into said grooves, and
    a transparent counter electrode on the readout side of said LC layer,
    means for applying an electrical potential across said electrode and counterelectrode to establish an electrical potential across said LC layer, said photoconductor responding to an input light beam to spatially modulate the potential across said LC layer in accordance with the spatial characteristics of said input beam, said grooves establishing potential barriers to the migration of charge between said pixels.

2. The LCLV of claim 1, the pattern of LC in said grooves forming diffraction gratings in response to a readout beam, and further comprising an optical filter on the readout side of said counterelectrode, said filter including light blocking elements at locations corresponding to said diffraction gratings.

3. The LCLV of claim 1, further comprising respective islands of insulative material extending over said pixels between said photoconductor material and said LC, said insulative material overhanging and partially closing said grooves between pixels.

4. The LCLV of claim 3, further comprising layers of reflective material on said islands of insulative material, said reflective material reflecting a readout beam from the underlying photoconductor material.

5. The LCLV of claim 4, said layers of reflective material comprising a metal matrix mirror.

6. The LCLV of claim 4, said insulative and reflective materials extending within and partially across said grooves to shield the underlying photoconductor material from a readout beam.

7. The LCLV of claim 6, wherein said reflective material is conductive, and the reflective material within said grooves is discontinuous with the reflective material on said pixels to avoid shorting adjacent pixels.

8. The LCLV of claim 3, said grooves being substantially wider at their upper ends than at the bottom of the grooves.

9. The LCLV of claim 1, further comprising respective islands of reflective conductive material extending over said pixels between said photoconductor material and said LC, said reflective material reflecting and shielding the underlying photoconductor layer from a readout beam.

10. The LCLV of claim 9, said islands of reflective conductive material comprising a metal matrix mirror.

11. The LCLV of claim 9, said reflective conductive material extending within and partially across said grooves to shield the underlying photoconductor material from a readout beam, the reflective conductive material within said grooves being discontinuous to avoid shorting adjacent pixels.

12. The LCLV of claim 9, said grooves being substantially wider at their upper than at their lower ends.

13. The LCLV of claim 1, wherein said photoconductor material comprises silicon.

14. A method of pixelizing a photoconductor wafer for use in a liquid crystal light valve (LCLV), comprising:
    providing a layer of insulative material on a surface of the wafer,
    forming a grid of openings in said insulative layer to create discontinuities in the insulative material and expose a corresponding grid on said wafer surface, and
    etching said wafer through said openings to form a grid of grooves in said wafer, said grooves defining pixels for spatial light modulation therebetween.

15. The method of claim 14, further comprising the step of depositing respective layers of reflective conductive material over the insulative material on said pixels, said conductive layers being insulated from each other by said grooves.

16. The method of claim 15, wherein the etching of said wafer is controlled so that the insulative material overhangs and partially closes said grooves.

17. The method of claim 16, said etching step comprising a wet etch to form grooves which are wider at their upper than the bottom of the grooves.

18. The method of claim 16, said etching step comprising a dry etch form grooves of substantially uniform width, followed by a wet etch to widen the upper portions of the grooves.

19. The method of claim 16, further comprising the step of depositing a passivating insulative material into said grooves.

20. The method of claim 19, wherein said reflective conductive material is also deposited onto the insulative material in said grooves to shield the underlying photoconductor material from a readout beam, said overhanging insulative material masking portions of said grooves during deposition of said reflective conductive material to create electrical discontinuities in the reflective conductive material within said grooves and prevent shorting adjacent pixels.

21. The method of claim 20, intended for use with a LCLV which receives a readout beam at a predetermined angle, wherein said reflective conductive material is deposited in said grooves at substantially the same angle.

22. The method of claim 14, further comprising the steps of removing said insulative material after formation of said grooves, and depositing a reflective conductive material on the photoconductor material within said pixels.

23. The method of claim 22, wherein said reflective conductive material is also deposited into said grooves to shield the underlying photoconductor material, said deposit being made with discontinuities in the reflective conductive material to prevent shorting adjacent pixels.

24. The method of claim 23, said reflective conductive material being deposited into said grooves at an angle substantially less than 90° to the wafer surface, the wafer surface on one side of the grooves partially shadowing the grooves to assist in the formation of said discontinuities.

* * * * *